(12) United States Patent
Ogasawara et al.

(10) Patent No.: US 12,516,215 B2
(45) Date of Patent: Jan. 6, 2026

(54) THERMOSETTING COATING COMPOSITION AND COATED ARTICLE

(71) Applicant: KANSAI PAINT CO., LTD., Amagasaki (JP)

(72) Inventors: Mutsumi Ogasawara, Hiratsuka (JP); Fumio Yamashita, Hiratsuka (JP)

(73) Assignee: KANSAI PAINT CO., LTD., Amagasaki (JP)

( * ) Notice: Subject to any disclaimer, the term of this patent is extended or adjusted under 35 U.S.C. 154(b) by 723 days.

(21) Appl. No.: 17/434,155

(22) PCT Filed: Feb. 5, 2020

(86) PCT No.: PCT/JP2020/004363
§ 371 (c)(1),
(2) Date: Aug. 26, 2021

(87) PCT Pub. No.: WO2020/175065
PCT Pub. Date: Sep. 3, 2020

(65) Prior Publication Data
US 2022/0169883 A1 Jun. 2, 2022

(30) Foreign Application Priority Data
Feb. 27, 2019 (JP) .................. 2019-033925

(51) Int. Cl.
*C09D 133/06* (2006.01)
*C08K 5/29* (2006.01)
*C08K 5/5399* (2006.01)
*C09D 7/20* (2018.01)
*C09D 7/63* (2018.01)
*C09D 163/00* (2006.01)
*C09D 167/04* (2006.01)

(52) U.S. Cl.
CPC ............ *C09D 133/066* (2013.01); *C08K 5/29* (2013.01); *C08K 5/5399* (2013.01); *C09D 7/20* (2018.01); *C09D 7/63* (2018.01); *C09D 163/00* (2013.01); *C09D 167/04* (2013.01)

(58) Field of Classification Search
None
See application file for complete search history.

(56) References Cited

U.S. PATENT DOCUMENTS

| | | | |
|---|---|---|---|
| 5,994,479 A * | 11/1999 | Green | C09D 161/20 525/481 |
| 2005/0123770 A1 | 6/2005 | Kawazu et al. | |
| 2011/0021714 A1 | 1/2011 | Gilmartin et al. | |
| 2013/0101841 A1* | 4/2013 | Yang | C09D 183/04 524/588 |
| 2019/0276702 A1 | 9/2019 | Gontani et al. | |
| 2019/0390055 A1* | 12/2019 | Hu | C08L 33/08 |

FOREIGN PATENT DOCUMENTS

| | | |
|---|---|---|
| GB | 2479075 A | 9/2011 |
| JP | 5-51472 A | 3/1993 |
| JP | 2000-280542 A | 10/2000 |
| JP | 2004-307800 A | 11/2004 |
| JP | 2005-139273 A | 6/2005 |
| JP | 2011-26320 A | 2/2011 |
| JP | 2012-152725 A | 8/2012 |
| JP | 2014-141598 A | 8/2014 |
| JP | 2016-138202 A | 8/2016 |
| WO | WO 99/35198 A1 | 7/1999 |
| WO | WO 01/09261 A1 | 2/2001 |
| WO | WO 03/011992 A2 | 2/2003 |
| WO | WO 2010/047195 A1 | 4/2010 |
| WO | WO 2018/096780 A1 | 5/2018 |

OTHER PUBLICATIONS

International Search Report, issued in PCT/JP2020/004363, PCT/ISA/210, dated Apr. 21, 2020.
Extended European Search Report for European Application No. 20763271.2, dated Nov. 18, 2022.

* cited by examiner

*Primary Examiner* — Megan McCulley
(74) *Attorney, Agent, or Firm* — Birch, Stewart, Kolasch & Birch, LLP

(57) ABSTRACT

A thermosetting coating composition includes a hydroxyl group-containing resin, a curing agent, a phosphazene compound, and a solvent. The curing agent is a polyisocyanate curing agent and/or a blocked polyisocyanate curing agent.

8 Claims, No Drawings

THERMOSETTING COATING COMPOSITION AND COATED ARTICLE

TECHNICAL FIELD

The present disclosure relates to a thermosetting coating composition and a coated article.

BACKGROUND ART

Isocyanate curing agents are a type of curing agent for use in coating compositions and the like. For example, polyisocyanates which are active at ambient temperature, blocked polyisocyanates which are inactivated at ambient temperature and the like have been widely used.

As a catalyst to accelerate curing reaction of the isocyanate curing agents, organotin compounds such as dibutyltin oxide, dioctyltin oxide, dibutyltin dilaurate, and dioctyltin dilaurate have been generally used (see Patent Literature 1 and Patent Literature 2).

However, the toxicity of the organotin compounds has been a problem in recent years despite excellent catalytic performance thereof. There is a demand for a catalyst to replace the organotin compounds. As substitutes for the organotin compounds, bismuth-based or zinc-based catalysts have been developed (see Patent Literatures 3 and 4).

CITATION LIST

Patent Literature

[Patent Literature 1] Japanese Unexamined Patent Application Publication No. 2004-307800
[Patent Literature 2] Japanese Unexamined Patent Application Publication No. 2005-139273
[Patent Literature 3] Japanese Unexamined Patent Application Publication No. 2000-290542
[Patent Literature 4] Japanese Unexamined Patent Application Publication No. 2012-152725

SUMMARY OF THE DISCLOSURE

Technical Problem

Conventional thermosetting coating compositions have environmental problems since they contain metal catalysts. Additionally, the bismuth-based or zinc-based catalysts have problems of being expensive, insufficient in catalytic effect or unstable in coating compositions.

The present invention has been made in view of such circumstances to provide a thermosetting coating composition excellent in paint stability, coating film curability and water resistance using substantially no metal catalyst; and a coated article obtained by applying such thermosetting coating composition.

Solution to the Problem

As a result of inventive studies for solving the aforementioned problems, the inventors found that the problems can be solved by a thermosetting coating composition containing a hydroxyl group-containing resin, a polyisocyanate curing agent and/or a blocked polyisocyanate curing agent as a curing agent, a phosphazene compound, and a solvent, thereby accomplishing the present invention.

More specifically, this disclosure provides the following thermosetting coating composition and coated article obtained by applying the thermosetting coating composition.

A thermosetting coating composition according to the present disclosure includes a hydroxyl group-containing resin (A), a curing agent (B), a phosphazene compound (C), and a solvent (D), the curing agent (B) being a polyisocyanate curing agent and/or a blocked polyisocyanate curing agent.

The phosphazene compound (C) preferably has a number average molecular weight of 400 or more.

The content of the phosphazene compound (C) is preferably 0.1 parts by mass or more and 30 parts by mass or less based on 100 parts by mass of resin solids of the thermosetting coating composition.

The hydroxyl group-containing resin (A) is preferably at least one selected from the group consisting of an acrylic resin (A1), a polyester resin (A2), and an epoxy resin (A3).

The solvent (D) preferably contains 70% by mass or more of water based on the total mass of the solvent (D).

The hydroxyl group-containing resin (A) is preferably water dispersible or water dissoluble.

A coated article according to the present disclosure is obtained by applying the thermosetting coating composition of the disclosure to an article to be coated.

A coated article according to the present disclosure includes a multilayer coating film obtained by applying the thermosetting coating composition of the disclosure to an article to be coated; and applying a top coat composition to the article to be coated.

Advantageous Effects of the Disclosure

The thermosetting coating composition of the disclosure can form a coating film good in paint stability, coating film curability and water resistance using substantially no metal catalyst.

DESCRIPTION OF EMBODIMENTS

This disclosure provides a thermosetting coating composition that includes a hydroxyl group-containing resin (A), a curing agent (B), a phosphazene compound (C), and a solvent (D), the curing agent (B) being a polyisocyanate curing agent and/or a blocked polyisocyanate curing agent.

Hereinafter, such thermosetting coating composition and coated article therewith will be described in detail.

1. Hydroxyl Group-Containing Resin (A)

As the hydroxyl group-containing resin (A) for use in the thermosetting coating composition of the disclosure, any resin known in the art may be used without particular limitation, as long as it has a hydroxyl group and can be crosslinked with the curing agent (B).

Examples of a reactive functional group other than the hydroxyl group to crosslink with the polyisocyanate curing agent and the blocked polyisocyanate curing agent include reactive functional groups containing active hydrogen such as an amino group, a carboxyl group and an active methylene group; an epoxy group; and a carboxylic anhydride group. These may be used in combination with the hydroxyl group.

Examples of the hydroxyl group-containing resin (A) include an acrylic resin, a polyester resin, an epoxy resin, an alkyd resin, a polyether resin, a polyurethane resin, and a polyamide resin. These may be used alone or in combination of two or more. Among these, the hydroxyl group-containing resin (A) is preferably at least one selected from an acrylic resin (A1), a polyester resin (A2), and an epoxy resin (A3).

The hydroxyl group-containing resin (A) is preferably dispersed (e.g., emulsified in an aqueous solvent) or dissolved in the thermosetting coating composition. When dispersed, the hydroxyl group-containing resin (A) may be crosslinked resin particles.

1-1. Acrylic Resin (A1)

The acrylic resin (A1) for use in the thermosetting coating composition of the disclosure is a resin having a hydroxyl group and can be produced by radical copolymerization of acrylic monomers.

Examples of the acrylic monomers include hydroxyl group-containing acrylic monomers such as addition products of 2-hydroxyethyl (meth)acrylate, 2-hydroxypropyl (meth)acrylate, 4-hydroxybutyl (meth)acrylate or 2-hydroxyethyl (meth) acrylate with caprolactone (e.g., PLACCEL FA-2 and FM-3, trade names, available from Daicel Corporation); aromatic vinyl monomers such as styrene, vinyltoluene, and α-methylstyrene; methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, cyclohexyl (meth)acrylate, 2-ethylhexyl (meth)acrylate, polyalkylene glycol (meth) acrylate, isobornyl (meth)acrylate, (meth)acrylic acid, N,N-dimethylaminoethyl (meth)acrylate, N,N-diethylaminoethyl (meth)acrylate, N,N-dimethylaminopropyl (meth)acrylate, N,N-di-t-butylaminoethyl (meth)acrylate, and N,N-dimethylaminopropyl (meth) acrylamide. These may be used alone or in combination of two or more.

The acrylic resin (A1) can be produced by radical copolymerization reaction of these acrylic monomers by methods known in the art.

The acrylic resin (A1) has a hydroxyl value generally within a range of 0.1 to 300 mg KOH/g, preferably 10 to 200 mg KOH/g. The acrylic resin (A1) has a weight average molecular weight generally within a range of 1,000 to 100,000, preferably 2,000 to 30,000.

Herein, the number average molecular weight and the weight-average molecular weight are values calculated by converting the retention time (retention volume) measured using a gel permeation chromatograph (GPC) to the molecular weight of polystyrene by the retention time (retention volume) of a standard polystyrene having a known molecular weight measured under the same conditions. Concretely, the gel permeation chromatograph may be "HLC8120GPC" (trade name, available from Tosoh Corporation). The columns may be four columns of "TSKgel G-4000HXL", "TSKgel G-3000HXL", "TSKgel G-2500HXL" and "TSKgel G-2000HXL" (trade names, available from Tosoh Corporation). The measurements can be performed under the conditions where the mobile phase is tetrahydrofuran; the measurement temperature is 40.degree. C.; the flow rate is 1 mL/min; and a RI detector is used. Note that, in the measurement of the molecular weight of the phosphazene compound (C) described later, the mobile phase was tetrahydrofuran to which 0.5% by mass of triethanolamine was added.

1-2. Polyester Resin (A2)

The polyester resin (A2) for use in the thermosetting coating composition of the disclosure has a hydroxyl group and can be produced by esterification reaction and/or transesterification reaction of an acid component with an alcohol component.

As the acid component, any compound which is commonly used as an acid component in production of polyester resin may be used without particular limitation. Examples of the acid component include alicyclic polybasic acid, aliphatic polybasic acid, aromatic polybasic acid, aromatic monocarboxylic acid, aliphatic monocarboxylic acid, alicyclic monocarboxylic acid, and lower alkyl esterified products of these acids.

The alicyclic polybasic acid is generally a compound having one or more alicyclic structures (mainly four to six membered rings) and two or more carboxyl groups in one molecule, an acid anhydride of this compound, or an esterified product of this compound.

The aliphatic polybasic acid is generally an aliphatic compound having two or more carboxyl groups in one molecule, an acid anhydride of this compound, or an esterified product of this compound.

The aromatic polybasic acid is generally an aromatic compound having two or more carboxyl groups in one molecule, an acid anhydride of this aromatic compound, or an esterified product of this aromatic compound.

As the alcohol component, any compound which is commonly used as an alcohol component in production of polyester resin may be used without particular limitation. The alcohol component preferably contains dihydric alcohol such as alicyclic diol, aliphatic diol and aromatic diol, and polyhydric alcohol having three or more valences.

The polyester resin (A2) can be produced by reaction of the acid component with the alcohol component by methods known in the art.

Further, the polyester resin (A2) may be modified with fatty acids, oils and fats, polyisocyanate compounds, epoxy compounds or the like during the preparation of the polyester resin (A2), or after the esterification reaction and/or after the transesterification reaction.

The polyester resin (A2) has a number average molecular weight generally within a range of 1,000 to 20,000, preferably 1,050 to 10,000, and more preferably 1,100 to 5,000 from the viewpoint of the finished appearance.

The polyester resin (A2) has a hydroxyl value generally within a range of 20 to 300 mg KOH/g, preferably 30 to 250 mg KOH/g, and more preferably 40 to 180 mg KOH/g from the viewpoint of the curability of a resulting coating film.

1-3. Epoxy Resin (A3)

The epoxy resin (A3) for use in the thermosetting coating composition of the disclosure is a resin having a hydroxyl group and can be produced by reaction of an epoxy resin (A3-1) with a modifier (A3-2).

The epoxy resin (A3-1) for use as a raw material of the epoxy resin (A3) is a compound having at least one, preferably two or more epoxy groups in one molecule. The epoxy resin (A3-1) suitably has a number average molecular weight of at least 180, preferably within a range of 400 to 4,000, and more preferably 800 to 2,500; and an epoxy equivalent of at least 90, preferably within a range of 180 to 2,500, and more preferably 400 to 1500. Such epoxy resin (A3-1) may be a resin obtained by reaction of a polyphenol compound with epihalohydrin (e.g., epichlorohydrin).

Examples of the polyphenol compound used for forming the epoxy resin (A3-1) include bis(4-hydroxyphenyl)-2, 2-propane [bisphenol A], bis(4-hydroxyphenyl)methane [bisphenol F], bis(4-hydroxycyclohexyl)methane [hydrogenated bisphenol F], 2,2-bis(4-hydroxycyclohexyl)propane [hydrogenated bisphenol A], 4,4'-dihydroxybenzophenone, bis(4-hydroxyphenyl)-1,1-ethane, bis(4-hydroxyphenyl)-1,1-isobutane, bis(4-hydroxy-3-tert-butyl-phenyl)-2,2-propane, bis(2-hydroxynaphthyl)methane, tetra(4-hydroxyphenyl)-1,1,2,2-ethane, 4,4'-dihydroxydiphenylsulfone, phenol novolac, and cresol novolac.

The epoxy resin (A3-1) produced by the reaction of a polyphenol compound with epihalohydrin may suitably be a resin derived from bisphenol A, which is represented by the following formula.

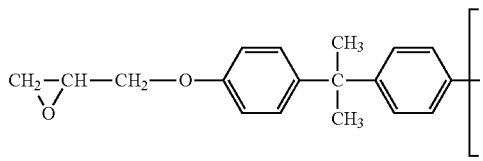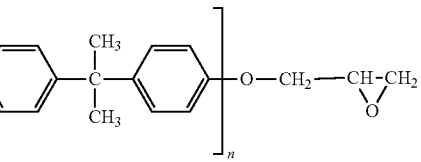

Here, it is preferable that n=0 to 8.

Examples of commercially available products of the epoxy resin (A3-1) include products sold under the trade names of jER828EL, jER1002, jER1004 and jER1007 from Mitsubishi Chemical Corporation.

The modifier (A3-2) for use as a raw material of the epoxy resin (A3) may be any modifier selected without particular limitation, as long as it has reactivity with the epoxy resin (A3-1). Examples of the modifier (A3-2) include polyhydric alcohol, monohydric alcohol, an acidic compound, phenols, an amine compound, lactones, an isocyanide compound, and a xylene formaldehyde compound.

Examples of the polyhydric alcohol include dihydric alcohols such as ethylene glycol, diethylene glycol, propylene glycol, dipropylene glycol, 1,3-propanediol, 1,3-butanediol, 1,4-butanediol, 2,3-butanediol, 1,5-pentanediol, 1,6-hexanediol, 1,7-heptanediol, 1,8-octanediol, 1,9-nonanediol, 2-methyl-1,3-propanesiol, 3-methyl-1,5-pentanediol, 2-methylpentane-2,4-diol, 2,2,4-trimethyl-1,3-pentanediol, triethylene glycol, 2-butyl-2-ethyl-1,3-propanediol, tricyclodecanedimethanol, triethylene glycol, neopentyl glycol, 1,4-cyclohexanediol, 1,3-cyclohexanedimethanol, 1,4-cyclohexanedimethanol, bisphenol A, bisphenol F, hydrogenated bisphenol A, hydrogenated bisphenol F; polyether diols such as polyethylene glycol, polypropylene glycol, and polybutylene glycol; trihydric alcohols such as glycerin, trimethylolpropane, and tris(2-hydroxyethyl) isocyanurate; tetravalent alcohols such as pentaerythritol; polyester polyol; and acrylic polyol.

Examples of the monohydric alcohol include methanol, ethanol, n-propanol, isopropanol, n-butanol, 2-butanol, pentanol, hexanol, n-octanol, 2-ethylhexanol, dodecyl alcohol, stearyl alcohol, and benzyl alcohol.

Examples of the acidic compound include acidic compounds such as acetic acid, propionic acid, butyric acid, valeric acid, acrylic acid, oleic acid, glycolic acid, lactic acid, benzoic acid, gallic acid, fatty acid, and dibasic acid.

Examples of the phenols include phenol, cresol, ethylphenol, para-tert-butylphenol, nonyl phenol, catechol, resorcinol, and 4-tert-butyl catechol.

The amine compound may be any amine compound selected without particular limitation, as long as it contains at least one active hydrogen to react with an epoxy group. Examples thereof include mono- or di-alkylamines such as monomethylamine, dimethylamine, monoethylamine, diethylamine, monoisopropylamine, diisopropylamine, monobutylamine, dibutylamine; alkanolamines such as monoethanolamine, diethanolamine, mono(2-hydroxypropyl)amine, di(2-hydroxypropyl)amine, monomethylaminoethanol, monoethylaminoethanol; alkylene polyamines such as ethylenediamine, propylenediamine, butylenediamine, hexamethylenediamine, tetraethylenepentamine, pentaethylenehexamine, diethylaminopropylamine, diethylenetriamine, and triethylenetetramine; alkylene imines such as ethyleneimine and propylene imine; cyclic amines such as piperazine, morpholine, and pyrazine. These amines may be used in combination with amines obtained by ketiminization of primary amines. These may be used alone or in combination of two or more.

The epoxy resin (A3) can be produced by reaction of the epoxy resin (A3-1) with the modifier (A3-2) by methods known in the art.

The epoxy resin (A3) has a number average molecular weight generally within a range of 1,000 to 50,000, preferably 1,300 to 20,000, and more preferably 1,600 to 10,000 from the viewpoints of the paint stability, finished appearance and corrosion resistance. The epoxy resin (A3) has a hydroxyl value generally within a range of 10 to 300 mg KOH/g, preferably 20 to 250 mg KOH/g, and more preferably 30 to 200 mg KOH/g from the viewpoint of the curability of a resulting coating film.

2. Curing Agent (B)

The curing agent (B) for use in the thermosetting coating composition of the disclosure is a polyisocyanate curing agent (B1) and/or a blocked polyisocyanate curing agent (B2).

The polyisocyanate curing agent (B1) may be any agent known in the art selected without particular limitation. Examples thereof include aromatic, aliphatic or alicyclic polyisocyanate compounds such as tolylenediisocyanate, xylylene diisocyanate, phenylenediisocyanate, diphenylmethane-2,2'-diisocyanate, diphenylmethane-2,4'-diisocyanate, diphenylmethane-4,4'-diisocyanate, crude MDI [polymethylene polyphenyl isocyanate], bis(isocyanate methyl)cyclohexane, tetramethylene diisocyanate, hexamethylene diisocyanate, methylene diisocyanate, and isophorone diisocyanate; cyclized polymers or biurets of these polyisocyanate compounds; or combinations thereof.

The blocked polyisocyanate curing agent (B2) is a product of addition reaction between a polyisocyanate compound and an isocyanate blocking agent in an approximately stoichiometric amount.

The polyisocyanate compound used in the blocked polyisocyanate curing agent may be any compound known in the art selected without particular limitation. For example, the polyisocyanate compound may be any of the compounds and the like exemplified as the polyisocyanate curing agent (B1) above.

The isocyanate blocking agent is a compound that is added to an isocyanate group of the polyisocyanate compound. It is preferable that the blocked polyisocyanate compound formed upon the addition of the isocyanate blocking agent is stable at room temperature but dissociates to regenerate an isocyanate group when heated to a baking temperature of a coating film (generally about 80 to 200.degree. C.).

Examples of the isocyanate blocking agent used in the blocked polyisocyanate curing agent (B2) include oxime compounds such as methylethylketoxime and cyclohexanone oxime; phenolic compounds such as phenol, para-t-butylphenol, and cresol; alcohol compounds such as n-butanol, 2-ethylhexanol, phenylcarbinol, methylphenylcarbinol, ethylene glycol monobutyl ether, diethylene glycol monoethyl ether, ethylene glycol, and propylene glycol; lactam compounds such as ε-caprolactam and γ-butyrolactam; active methylene compounds such as dimethyl malonate, diethyl malonate, diisopropyl malonate, ethyl acetoacetate, methyl acetoacetate, and acetylacetone; pyrazole compounds such as dimethylpyrazole. These may be used alone or in combination of two or more. Among these, the isocyanate blocking agent may preferably be at least one selected from the alcohol compounds, the pyrazole compounds, the oxime compounds and the lactam compounds from the viewpoints of the dissociation temperature and paint stability. Particularly preferred is the alcohol compounds.

3. Phosphazene Compound (C)

The phosphazene compound (C) used in the disclosure is a compound having a phosphazene unit in the molecule, including monomers, oligomers, polymers (resins) and the like. Note that, the phosphazene unit represents a bonding unit of N=P in the present disclosure. Plural phosphazene units can be bonded with each other. It is known that the more phosphazene units, the higher the basicity of the compound, in general.

The phosphazene compound can be used as a catalyst for siloxane crosslinking reaction or the like since it is a strong base. However, the thermosetting coating composition of the disclosure employs NCO—OH crosslinking, the siloxane crosslinking reaction is not a subject thereof.

The phosphazene compound (C) used in the present disclosure acts as a strong base catalyst for the NCO—OH crosslinking reaction. The blocking agent in the blocked polyisocyanate curing agent (B2) is dissociated by heat. This regenerates free isocyanate groups, which react with the hydroxyl group-containing resin (A) to proceed the crosslinking reaction. It is believed that the phosphazene compound (C) functions as a dissociation catalyst in the blocked polyisocyanate curing agent (B2) and as a catalyst for the reaction between the hydroxyl group-containing resin (A) and the isocyanate groups since the phosphazene compound (C) is a strong base. Therefore, the NCO—OH crosslinking reaction proceeds in the thermosetting coating composition of the disclosure without using any metal catalyst as in the related art.

The phosphazene compound (C) used in the thermosetting coating composition of the disclosure may be any compound having a phosphazene unit selected without particular limitation. Specific examples thereof include tert-butylimino-tris(dimethylamino)phospholane and its derivatives; tert-butylimino-tri(pyrrolidino)phospholane and its derivatives; and 1-tert-octyl-4,4,4-tris(dimethylamino)-2,2-bis[tris(dimethylamino)phosphoranylidenamino]-2λ$^5$, 4λ$^5$-catenage (phosphazenes) and its derivatives.

The phosphazene compound (C) used in the thermosetting coating composition of the disclosure may contain a hydroxyl group. When it contains a hydroxyl group, the hydroxyl group crosslinks with the curing agent (B), thereby enhancing the water resistance of a coating film.

The phosphazene compound (C) used in the thermosetting coating composition of the disclosure preferably has a number average molecular weight of 400 to 1,000,000 from the viewpoint of the coating film performance (water resistance, etc.). More preferably, the phosphazene compound (C) has a number average molecular weight within a range of 600 to 500,000, and particularly preferably 1,000 to 100,000.

The phosphazene compound (C) used in the thermosetting coating composition of the disclosure is preferably a phosphazene compound (C1) having one or more organic groups in one molecule represented by the following general formula (1) from the viewpoint of the catalytic performance and coating film performance (water resistance, etc.).

[Chemical formula 1]

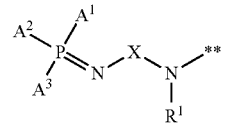

(1)

In the general formula (1), ** represents a bond or a hydrogen atom. X represents a divalent organic group having 1 to 18 carbons, and such organic group may contain an oxygen atom and/or a nitrogen atom. $R^1$ represents a hydrogen atom or an organic group having 1 to 18 carbon atoms, and such organic group may contain at least one selected from the group consisting of an oxygen atom, a nitrogen atom, a sulfur atom and a halogen atom. $A^1$, $A^2$ and $A^3$ each represent a monovalent organic group. This organic group may include at least one selected from the group consisting of a carbon atom, a hydrogen atom, an oxygen atom, a nitrogen atom, a phosphorus atom, a sulfur atom and a halogen atom. These organic groups may be identical or independent from each other, and two or more kinds of atoms may combine to form a cyclic structure.

Preferably, in the phosphazene compound (C1) having one or more organic groups represented by the general formula (1) in one molecule, $A^1$, $A^2$ and $A^3$ in the general formula (1) each contain at least one nitrogen atom from the viewpoints of the stability, catalytic performance and coating film performance (water resistance, etc.) of the compound, and a phosphorus atom adjacent to such organic group and a nitrogen atom in the organic group are singly bonded.

Preferably, in the phosphazene compound (C1) having one or more organic groups represented by the general formula (1) in one molecule, $A^1$, $A^2$ and/or $A^3$ each are an organic group represented by the formula (2) below.

[Chemical formula 2]

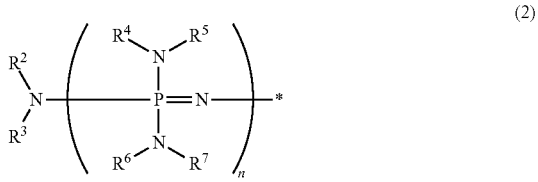

(2)

In the formula (2), * represents a bond. $R^2$ to $R^7$ each represent an organic group having 1 to 12 carbons, and each organic group may contain an oxygen atom and/or a nitrogen atom. These organic groups may be identical or independent from each other, and two or more kinds of atoms may combine to form a cyclic structure. Represented by n is an integer of 0 to 10.

The more phosphazene units in the phosphazene compound (C1), the higher the basicity of the compound, thereby increasing the catalytic effect when applied in the coating composition, while decreasing the paint stability and coating film performance (water resistance, etc.). Accordingly, from the viewpoints of the paint stability and coating film performance (water resistance, etc.), the phosphazene compound (C1) preferably has n of 0 to 7, more preferably 0 to 4, still more preferably 0 or 1, and particularly preferably 0 in the formula (2). When n is 0, the formula (2) is expressed as the following formula (3).

[Chemical formula 3]

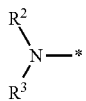

(3)

In the formula (3), *, $R^2$ and $R^3$ are synonymous with those in the formula (2).

Concrete examples of the organic group represented by the formula (3) include dialkylamino groups such as an N,N-dimethylamino group, an N,N-diethylamino group, an N,N-dipropylamino group, an N,N-diisopropylamino group, an N,N-dibutylamino group, an N,N-dioctylamino group, an N-methyl-N-propylamino group, an N-methyl-N-butylamino group, and an N,N-di(2-ethylhexyl)amino group; and cyclic amino groups such as a pyrrolyl group, a morpholino group, a piperidino group, a pyrrolidino group, and an N-alkylpiperazino group. In the phosphazene compound (C1), $A^1$, $A^2$ and $A^3$ in the general formula (1) are particularly preferably the cyclic amino groups from the viewpoints of the paint stability and coating film performance (water resistance, etc.).

Examples of the phosphazene compound (C1) having one or more organic groups represented by the general formula (1) in one molecule include a phosphazene compound (C2), of which  in the general formula (1) is a hydrogen atom, and a phosphazene compound (C3) having one or more organic groups in one molecule, of which  in the general formula (1) is a bond. The production methods of the phosphazene compounds (C2) and (C3) will be described below.

3-1. Production Method for Phosphazene Compound (C2)

The phosphazene compound (C2) is a compound, of which ** in the general formula (1) represents a hydrogen atom, and is represented by the following formula (1)'.

[Chemical formula 4]

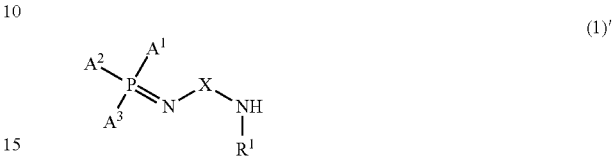

(1)'

In the formula (1)', X, $R^1$, $A^1$, $A^2$ and $A^3$ are synonymous with those in the general formula (1).

The phosphazene compound (C2) is produced by reacting phosphorus pentachloride with any organic compound (A') having one or more reactive functional groups in one molecule, and then reacting it with a diamine compound (E) represented by the following formula (6) to deprotonate with a strong base.

[Chemical formula 5]

(6)

In the formula (6), X and $R^1$ are synonymous with those in the general formula (1).

Reacting phosphorus pentachloride with any organic compound (A') having one or more reactive functional groups in one molecule in the presence of dichloromethane produces an intermediate (α) represented by the following formula (7).

[Chemical formula 6]

(7)

In the formula (7), $A^1$, $A^2$ and $A^3$ are synonymous with those in the general formula (1).

The organic compound (A') having one or more reactive functional groups in one molecule is converted to the organic group of $A^1$, $A^2$ and $A^3$ in the formula (7) through the reaction with phosphorus pentachloride. The organic compound (A') may be any organic compound selected without particular limitation, as long as it contains at least one selected from the group consisting of a carbon atom, a hydrogen atom, an oxygen atom, a nitrogen atom, a phosphorus atom, a sulfur atom and a halogen atom, and has one or more reactive functional groups in one molecule. Preferably, the organic compounds (A') is an organic compound having an amine as the reactive functional group. Concrete examples thereof include dialkylamines such as N,N-dimethylamine, N,N-diethylamine, N,N-dipropylamine, N,N-diisopropylamine, N,N-dibutylamine, N,N-dioctyl amine, N-methyl-N-propylamine, N-methyl-N-butylamine, and N,N-di(2-ethylhexyl)amine; and cyclic amines such as pyrrole, morpholine, piperidine, pyrrolidine, and N-alkylpiperazine. These may be used alone or in combination of two or more. Particularly preferably, the organic compound (A') is a cyclic amine from the viewpoint of the stability of the phosphazene compound (C2), the paint stability and the coating film performance (water resistance, etc.).

When the diamine compound (E) represented by the formula (6) is added to the intermediate (α), an amino group of the diamine compound (E) reacts with the intermediate (α), thereby producing an intermediate (β) represented by the following formula (8).

[Chemical formula 7]

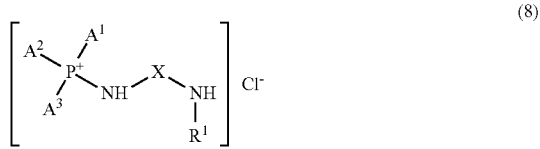

(8)

In the formula (8), X, $R^1$, $A^1$, $A^2$ and $A^3$ are synonymous with those in the formula (1).

When $R^1$ in the diamine compound (E) of the formula (6) is a hydrogen atom, that is, when both of the two amino groups of the diamine compound (E) are primary amines, it is highly likely that the intermediate (α) reacts with the two amino groups to produce a disubstituted form. Accordingly, it is preferable that the diamine compound (E) has one primary amino group and one secondary amino group. Specifically, $R^1$ in the diamine compound (E) of the formula (6) is preferably a monovalent organic group having 1 to 18 carbon atoms, and more preferably a monovalent organic group having 1 to 10 carbon atoms. When the diamine compound (E) contains both a primary amino group and a secondary amino group, the intermediate (α) preferentially reacts with the primary amino group, which is more reactive, thereby increasing the yield of the intermediate (β).

By adding a strong base to the intermediate (β) to deprotonate it, the phosphazene compound (C2) of the formula (1') can be produced.

The phosphazene compound (C2) of the general formula (1)' can be used by itself as a catalyst for the dissociation of the blocked polyisocyanate curing agent and as a catalyst for the reaction between the hydroxyl group-containing resin and the isocyanate groups. However, it is preferable to react the phosphazene compound (C2) with a compound having one or more reactive functional groups in one molecule to obtain a phosphazene compound (C3) from the viewpoint of the coating film performance (water resistance, etc.).

3-2. Method for Producing the Phosphazene Compound (C3)

The phosphazene compound (C3) is a phosphazene compound having one or more organic groups in one molecule, of which ** in the general formula (1) represents a bond. The phosphazene compound (C3) is produced by reacting an amino group of the phosphazene compound (C2) with a compound (F) having one or more reactive functional groups in one molecule.

The compound (F) having one or more reactive functional groups in one molecule may be any kind of compound selected without particular limitation, as long as it has one or more reactive functional groups which react with an active hydrogen group. Examples of the compound (F) include acrylic resin, polyester resin, urethane resin, epoxy resin, and a polyisocyanate compound.

The compound (F) having one or more reactive functional groups in one molecule preferably has a number average molecular weight of 150 or more, more preferably 150 to 1,000,000, still more preferably 400 to 500,000, and particularly preferably 800 to 100,000 from the viewpoint of the coating film performance (water resistance, etc.).

Concrete examples of the reactive functional group of the compound (F) having one or more reactive functional groups in one molecule include a glycidyl group, an isocyanate group, a blocked isocyanate group, a carbonyl group, and a carboxyl group. Among these, the reactive functional group is preferably at least one selected from the group consisting of a glycidyl group, an isocyanate group, and a blocked isocyanate group.

Reacting a compound containing a glycidyl group with the phosphazene compound (C2) can produce a phosphazene compound (C3-1) having organic groups represented by the following formula (4). Note that a part or all of the organic groups of the formula (4) may be ionized.

[Chemical formula 8]

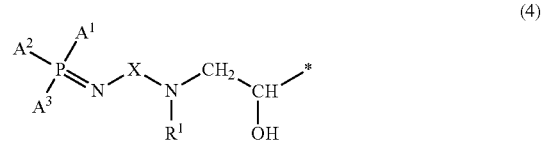

(4)

In the formula (4), * represents a bond. X, $R^1$, $A^1$, $A^2$ and $A^3$ are synonymous with those in the formula (1).

Reacting a compound containing an isocyanate group or a blocked isocyanate group with the phosphazene compound (C2) can produce a phosphazene compound (C 3-2) having organic groups represented by the following formula (5). Note that a part or all of the organic groups of the formula (5) may be ionized.

[Chemical formula 9]

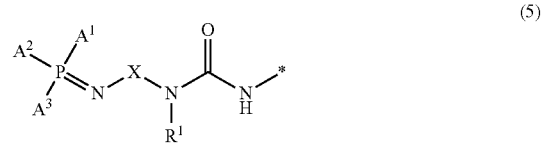

(5)

In the formula (5), * represents a bond. X, $R^1$, $A^1$, $A^2$ and $A^3$ are synonymous with those in the formula (1).

4. Solvent (D)

As the solvent (D) of the disclosure, any solvent known in the art, such as water or organic solvents, may be used without particular limitation. Examples of the organic solvents include hydrocarbons such as toluene, xylene, cyclohexane, and n-hexane; esters such as methyl acetate, ethyl acetate, and butyl acetate; ketones such as acetone; methyl ethyl ketone, methyl isobutyl ketone, methyl amyl ketone, and isobutyl methyl ketone; amides such as dimethylformamide and dimethylacetamide; alcohols such as methanol, ethanol, n-propanol, and iso-propanol; etheralcoholic compounds such as ethylene glycol monobutyl ether, diethylene glycol monoethyl ether, and propylene glycol monomethyl ether; and mixtures thereof.

Due to environmental considerations and the like, the solvent (D) is particularly preferably water. In the case that the solvent (D) is water, the content of the solvent (D) in the coating composition is preferably 70% by mass or more.

When water is used as the solvent (D), the hydroxyl group-containing resin (A) is preferably water dispersible or water soluble, since the hydroxyl group-containing resin (A) is preferably dispersed or dissolved in the coating composition.

5. Thermosetting Coating Composition

The blending ratio of the hydroxyl group-containing resin (A) and the curing agent (B) in the thermosetting coating composition of the disclosure is as follows from the viewpoint of obtaining an coated article excellent in finished appearance and curability: the component (A) is generally contained in an amount of 10 to 90% by mass, preferably 20 to 80% by mass; and the component (B) is generally contained in an amount of 10 to 60% by mass, preferably 15 to 55% by mass, based on the total mass of resin solids of the coating composition. The blending ratio within these ranges achieve good paint properties and coating film performance.

The content of the phosphazene compound (C) is generally within a range of 0.1 to 30% by mass, more preferably 0.5 to 20% by mass, and particularly preferably 1 to 15% by mass, based on the total mass of resin solids of the coating composition when converted by the mass of the phosphazene structure moiety from the viewpoint of the curability.

In addition to the components (A) to (D), the thermosetting coating composition of the disclosure may contain, if necessary, without any particular limitation, a resin containing no hydroxyl group, a pigment dispersion paste, a neutralizer, a surfactant, a surface conditioner, a thickening agent, an anti-settling agent, an ultraviolet absorber, a photostabilizer, an anti-foaming agent, a dissociation catalyst, a plasticizer or the like, for example.

The pigment dispersion paste is a paste in which pigments such as color pigments, antirust pigments and extender pigments are dispersed in fine particles in advance. For example, the pigment dispersion paste can be prepared by blending a pigment dispersion resin, a neutralizer, a solvent, and a pigment, and performing dispersion treatment on this mixture in a mixer such as a ball mill, a sand mill, or a pebble mill.

As the pigment, any pigment known in the art may be used without particular limitation. For example, the following pigments may be added: coloring pigments such as titanium dioxide, zinc oxide, zinc phosphate, alminium phosphate, zinc molybdate, calcium molybdate, iron blue, ultramarine, cobalt blue, copper phthalocyanine blue, indanthrone blue, synthetic yellow iron oxide, transparent bengala (yellow), bismuth vanadate, titanium yellow, zinc yellow, monoazo yellow, isoindolinone yellow, metal complex salt azo yellow, quinophthalone yellow, benzimidazolone yellow, bengala, monoazo red, quinacridone red, azo lake (Mn salt), quinacridone magenta, ansanthrone orange, dianthraquinonyl red, perylene maroon, quinacridone magenta, perylene red, diketopyrrolopyrrole chrome vermilion, chlorinated phthalocyanine green, brominated phthalocyanine green, pyrazolone orange, benzimidazolone orange, dioxazine violet, and perylene violet; body pigments such as barite powder, barium sulfate, barium carbonate, calcium carbonate, gypsum, clay, white carbon, diatomaceous earth, talc, magnesium carbonate, alumina white, gross white, and mica powder; antirust pigments such as aluminum phosphomolybdate, aluminum tripolyphosphate, and zinc oxide (zinc flower) and the like.

Suitable for use as a dissociation catalyst of the isocyanate blocking agent, other than the phosphazene compound (C) used in the present application, are bismuth compounds, zinc compounds, titanium compounds, amidine compounds, quaternary salt compounds, proazaphosphatran compounds and the like. However, it is preferable that organic tin compounds such as dibutyltin dibenzoate, dioctyltin oxide and dibutyltin oxide are not substantially used due to environmental considerations.

6. Method for Forming a Coating Film

As a method for forming a coating film used in the disclosure, any coating method known in the art may be used without particular limitation. Examples thereof include brush coating, roller coating, dipping coating, bar coater coating, applicator coating, curtain coating, spray coating, rotary atomization coating and electrodeposition coating.

The thickness of the coating film is not particularly limited. It may be generally in a range of 5 to 60 μm, preferably 10 to 40 μm, based on the dry coating film.

The coating film is heated and dried at a temperature of the surface of an article to be coated of 60 to 300.degree. C., preferably 80 to 200.degree. C., for 3 to 180 minutes, preferably 10 to 50 minutes, using drying equipment such as an electric hot air dryer or a gas hot air dryer. Such heating and drying provides a cured coating film.

Examples of the article to be coated of the disclosure include automobile bodies, automobile parts, two-wheeled vehicle parts, household appliances, and other appliances. The material of the article to be coated is not particularly limited. Examples thereof include metals, plastics, inorganic materials, wood, and fiber materials. In the case of metal materials, the article to be coated may have been subjected to surface cleansing such as alkaline degreasing, as required, and may have been further subjected to surface treatment such as phosphate chemical conversion treatment or chromate treatment, as required. The article may have been coated with a base coat composition.

After applying the thermosetting coating composition on the article, the article may be further coated with a top coat composition. The top coat composition may be any composition known in the art selected without particular limitation. Examples thereof include thermosetting water-based coating compositions, thermosetting solvent-based coating compositions, air drying water-based coating compositions, and air drying solvent-based coating compositions.

EXAMPLES

Hereinafter, the present disclosure will be explained in more detail by way of Examples and Comparative examples.

Methods for polymerization of resins, methods for production of coating compositions, methods for evaluation tests and the like used herein are the methods conventionally known in the art. However, the present invention is not limited thereto, and various modifications and variations are possible within the equivalent range of the technical idea and the scope of the claims of the invention.

In the following examples, the term "parts" means parts by mass, and the symbol "%" means mass percent.

Production of Hydroxyl Group-Containing Resin

Production Example 1: Acrylic Resin

In a four-necked flask equipped with a stirring device, a thermometer, a condenser tube and a nitrogen gas inlet, 31 parts of propylene glycol monomethyl ether was charged and heated to 110.degree. C. while introducing nitrogen gas. After the temperature reached 110.degree. C., the introduction of nitrogen gas was stopped, and a mixture consisting of 22 parts of 2-hydroxyethyl acrylate, 30 parts of methyl methacrylate, 22 parts of 2-ethylhexyl acrylate, 25 parts of styrene, 1 part of acrylic acid and 4 parts of 2,2'-azobis (isobutyronitrile) was added dropwise over the course of 4 hours. Then, the mixture was aged at 110.degree. C. for 2 hours while introducing nitrogen gas, cooled to 100.degree. C., and diluted with propylene glycol monomethyl ether. Thus, an acrylic resin (A-1) solution having a solids content of 60% was obtained. The acrylic resin (A-1) had a weight average molecular weight of 15,000, and a hydroxyl value of 106 mg KOH/g.

Production Example 2: Epoxy Resin

In a flask equipped with a stirrer, a thermometer, a nitrogen introducing tube and a reflux condenser, 1200 parts of jER828EL (trade name, available from Mitsubishi Chemical Corporation, epoxy equivalent: 190, number average molecular weight: 350), 500 parts of bisphenol A and 0.2 parts of dimethylbenzylamine were added. The mixture was allowed to react at 130.degree. C. until the epoxy equivalent of 850 was obtained. Next, 189 parts of diethanolamine was added, and the mixture was allowed to react at 120.degree. C. for 4 hours. Then, 480 g of ethylene glycol monobutyl ether was added. Thus, an amino group-containing epoxy resin (A-2) having a solids content of 80% was obtained. The epoxy resin (A-2) had an amine value of 53 mg KOH/g, and a number average molecular weight of 1900.

Production Example 3: Polyester Resin

In a reactor equipped with a heater, a stirrer, a nitrogen introducing tube and a fractionating column, 335 parts of phthalic anhydride, 357 parts of hexahydrophthalic acid, 42 parts of glycerine, 190 parts of ethylene glycol and 159 parts of neopentyl glycol were charged. The mixture was heated under dry nitrogen to gradually raise the temperature to 230.degree. C. to perform esterification reaction. The esterification reaction was allowed to proceed with the temperature held at 230.degree. C. until the resinous acid value of 5 mg KOH/g was obtained. Then, the mixture was cooled to 170.degree. C., and ethylene glycol monobutyl ether was added thereto. Thus, a polyester resin (A-3) solution having a resin solids content of 60% by mass was obtained. The resin solids of the obtained polyester resin (A-3) had an acid value of 5 mg KOH/g, a hydroxyl value of 81 mg KOH/g, and a number average molecular weight of 1,840.

Manufacturing of Curing Agents

Production Example 4: Blocked Polyisocyanate Curing Agent

In a four-necked flask equipped with a stirrer, a heater, a cooler and a decompressor, 272 parts of hexamethylene diisocyanate (B-1) and 214 parts of methyl ethyl ketone were charged and heated to 60.degree. C. Then, 169 parts of methyl ethyl ketoxime was gradually added with stirring over the course of 1 hour. Subsequently, the mixture was allowed to react at 60.degree. C. for 2 hours, and 59 parts of trimethylolpropane was gradually added such that the temperature would not reach 70.degree. C. or higher. Under stirring, the reaction mixture was allowed to react at 60.degree. C. until no free isocyanate group was detected by infrared spectroscopy. On the completion of the reaction, a blocked polyisocyanate curing agent (B-2) having a solids content of 70% was obtained. The NCO content of the blocked polyisocyanate curing agent (B-2) was 16.4%.

Production of Phosphazene Compound (C)

Production Example 5: Phosphazene Compound (C-1)

In a flask equipped with a thermometer and a dropping funnel, a suspension of 101.5 g of dichloromethane and 20.8 g (0.1 mol) of phosphorus pentachloride was held at around minus 30.degree. C. under nitrogen atmosphere and stirred. To this, 21.3 g (0.3 mol) of pyrrolidine and 40.5 g (0.4 mol) of triethylamine were added dropwise, and the temperature thereof was raised to room temperature. The obtained reaction product was held at around 0.degree. C., and 26.5 g (0.3 mol) of N-ethylenediamine was added dropwise. Then, the reaction product was held at a room temperature of 20 to 35.degree. C. The generated insoluble product was filtered, and the filtrate was washed using dichloromethane and deionized water to obtain an organic phase, which was then concentrated. To the obtained reaction product, a potassium methoxide/methanol solution, containing 6.3 g (0.09 mol) of potassium methoxide, was added and stirred at room temperature. The generated insoluble product was filtered and concentrated, thereby obtaining a phosphazene compound (C-1) having a molecular weight of 327. The yield after purification was about 80%.

1H-NMR (DMSO) δ (ppm): 0.99 (dd, J=7.0 Hz, 3H), 1.73 (m, 13H), 2.42 (t, J=5.6 Hz, 2H), 2.51 (dd, J1=14.4 Hz, J2=7.2 Hz, 2H), 3.06 (m, 14H).

Production Example 6: Phosphazene Compound (C-2)

In a flask equipped with a stirrer, a thermometer, a nitrogen introducing tube and a reflux condenser, 327 parts of the phosphazene compound (C-1) obtained in Production Example 5, 475 parts of jER1001 (trade name, available from Mitsubishi Chemical Corporation, epoxy resin, epoxy equivalent: 475, number average molecular weight: 900), and 537 parts of methylisobutyl ketone were added for reaction. The reaction was performed such that more than 99% of the amount of epoxy groups reacted.

Ethylene glycol monobutyl ether was added to adjust the solids content, thereby obtaining a phosphazene compound (C-2) solution having a solids content of 50%. The phosphazene compound (C-2) had a number average molecular weight of 1,500.

Production Example 7: Phosphazene Compound (C-3)

In a flask equipped with a stirrer, a thermometer, a nitrogen introducing tube and a reflux condenser, 327 parts of the phosphazene compound (C-1) obtained in Production Example 5, 925 parts of jER1004 (trade name, available from Mitsubishi Chemical Corporation, epoxy resin, epoxy equivalent: 925, number average molecular weight: 1650), and 537 parts of methyl isobutyl ketone were added for reaction. The reaction was performed such that more than 99% of the amount of epoxy groups reacted.

Ethylene glycol monobutyl ether was added to adjust the solids content, thereby obtaining a phosphazene compound (C-3) solution having a solids content of 50%. The phosphazene compound (C-3) had a number average molecular weight of 2,300.

Production Example 8: Phosphazene Compound (C-4)

In a flask equipped with a thermometer and a dropping funnel, a suspension of 101.5 g of dichloromethane and 20.8 g (0.1 mol) of phosphorus pentachloride was held at around minus 30.degree. C. under nitrogen atmosphere and stirred. 13.5 g (0.3 mol) of dimethylamine was bubbled therethrough, and 40.5 g (0.4 mol) of triethylamine was added dropwise. The temperature thereof was raised to room temperature. The obtained reaction product was held at around 0.degree. C., and 26.5 g (0.3 mol) of N-ethylenediamine was added dropwise. Thereafter, the reaction product was held at a room temperature of 20 to 35.degree. C. The generated insoluble product was filtered, and the filtrate was washed using dichloromethane and deionized water to obtain an organic phase, which was then concentrated. To the obtained reaction product, a potassium methoxide/methanol solution, containing 6.3 g (0.09 mol) of potassium methoxide, was added and stirred at room temperature. The generated insoluble product was filtered and concentrated, thereby obtaining a phosphazene compound (C-4') having a molecular weight of 249.

In a flask equipped with a stirrer, a thermometer, a nitrogen introducing tube and a reflux condenser, 249 parts of the phosphazene compound (C-4'), 475 parts of jER1001 (trade name, available from Mitsubishi Chemical Corporation, epoxy resin, epoxy equivalent: 475, number average molecular weight: 900), and 537 parts of methyl isobutyl ketone were added for reaction. The reaction was performed such that more than 99% of the amount of epoxy groups reacted.

Ethylene glycol monobutyl ether was added to adjust the solids content. Thus, a phosphazene compound (C-4) solution having a solids content of 50% was obtained. The phosphazene compound (C-4) had a number average molecular weight of 1,400.

Table 1, below, shows a list of phosphazene compounds used in the production of thermosetting coating compositions described later. Note that, the phosphazene compounds produced in Production Examples 5 to 8 may contain a by-product, an unreacted product or the like in addition to the compounds shown in Table 1.

TABLE 1

| Production Example | Phosphazene compound | Structure | |
|---|---|---|---|
| Production Example 5 | (C-1) | $A^2 \diagdown P \diagup A^1 \diagdown N \diagup X \diagdown N^* $ with $A^3$ and $R^1$ | $A^1, A^2, A^3$: 1-pyrrolidino group<br>X: $CH_2CH_2$<br>$R^1$: $CH_2CH_3$<br>★: H |
| Production Example 6 | (C-2) | | $A^1, A^2, A^3$: 1-pyrrolidino group<br>X: $CH_2CH_2$<br>$R^1$: $CH_2CH_3$<br>★: EP1 |
| Production Example 7 | (C-3) | | $A^1, A^2, A^3$: 1-pyrrolidino group<br>X: $CH_2CH_2$<br>$R^1$: $CH_2CH_3$<br>★: EP2 |
| Production Example 8 | (C-4) | | $A^1, A^2, A^3$: 1-pyrrolidino group<br>X: $CH_2CH_2$<br>$R^1$: $CH_2CH_3$<br>★: EP1 |
| | (C-5) | t-Bu–N=P(A)(A)–A | A: 1-pyrrolidino group |
| | (C-6) | A–P(A)(A)=N–P(A)(A)(N(t-Bu))–A | A: dimethylamino group |

The abbreviations in Table 1 denote as follows.
C-5: 79432-5ML (product number, available from Aldrich Inc., a phosphazene compound),
C-6: 79416-5ML (product number, available from Aldrich Inc., a phosphazene compound),
EP1: jER1001 (trade name, available from Mitsubishi Chemical Corporation, epoxy resin, epoxy equivalent: 475, number average molecular weight: 900),
EP2: jER1004 (trade name, available from Mitsubishi Chemical Corporation, epoxy resin, epoxy equivalent: 925, number average molecular weight: 1650)

Production of Pigment Dispersion Pastes

Production Example 9: a Solvent-Based Pigment Dispersion Paste

In flasks fitted with a stirrer, a thermometer, a drip funnel and a reflux condenser, 1010 parts of jER828 (trade name, available from Mitsubishi Chemical Corporation, epoxy resin, epoxy equivalent: 190, number average molecular weight: 370), and 390 parts of bisphenol A, 240 parts of PLACCEL 212 (trade name, polycaprolactone diol, Daicel Corporation, weight average molecular weight: about 1,250) and 0.2 parts of dimethylbenzylamine were added and allowed to react at 130.degree. C. until the epoxy equivalent of about 1,090 was obtained. Next, 134 parts of dimethylethanolamine and 150 parts of lactic acid were added, and the mixture was allowed to react at 120.degree. C. for 4 hours. Then, methyl isobutyl ketone was added to adjust the solids content, thereby obtaining a quaternary ammonium salt-containing resin solution for pigment dispersion having a solids content of 60%.

Subsequently, 8.3 parts (solids content: 5 parts) of such resin solution for pigment dispersion, 14.5 parts of titanium oxide, 8.0 parts of purified clay, 0.3 parts of carbon black, and 24.5 parts of propylene glycol monomethyl ether were added and dispersed for 20 hours with a ball mill, thereby obtaining a pigment dispersion paste (E-1) having a solids content of 50%.

Production Example 10: a Water-Based Pigment Dispersion Paste

In flasks fitted with a stirrer, a thermometer, a drip funnel and a reflux condenser, 1010 parts of jER828 (trade name, available from Mitsubishi Chemical Corporation, epoxy resin, epoxy equivalent: 190, number average molecular weight: 370), 390 parts of bisphenol A, 240 parts of PLACCEL 212 (trade name, polycaprolactone diol, Daicel Corporation, weight average molecular weight: about 1,250), and 0.2 parts of dimethylbenzylamine were added and allowed to react at 130.degree. C. until the epoxy equivalent of about 1,090 was obtained.

Then, 134 parts of dimethylethanolamine and 150 parts of a 90% aqueous lactic acid solution were added and reacted at 120.degree. C. for 4 hours. Then, methyl isobutyl ketone was added to adjust the solids content, thereby obtaining a quaternary ammonium salt-containing resin solution for pigment dispersion having a solids content of 60%.

Subsequently, 8.3 parts (solids content: 5 parts) of such resin solution for pigment dispersion, 14.5 parts of titanium oxide, 8.0 parts of purified clay, 0.3 parts of carbon black, and 24.5 parts of propylene glycol monomethyl ether were added and dispersed for 20 hours with a ball mill, thereby obtaining a pigment dispersion paste (E-2) having a solids content of 50%.

Production of Thermosetting Coating Compositions

1. Thermosetting Coating Compositions Containing Pigments

Example 1: a Thermosetting Coating Composition (X-1)

58.3 parts (solids content: 35 parts) of the acrylic resin (A-1) solution obtained in Production Example 1, 58.3 parts (solids content: 35 parts) of the epoxy resin (A-2) solution obtained in Production Example 2, 42.9 parts (solids content: 30 parts) of the blocked polyisocyanate curing agent (B-2) obtained in Production Example 4, 5.5 parts of the phosphazene compound (C-1) obtained in Production Example 5 were blended and uniformly stirred. Further, 46.0 parts of propylene glycol monomethyl ether was added to produce a thermosetting coating composition (X-1) having a solids content of 50%.

Examples 2-6, 8-16, Comparative Examples 1-2

Thermosetting coating compositions (X-2) to (X-6), (X-8) to (X-18) having a solids content of 50% were produced in the same manner as in Example 1, except for the conditions shown in Tables 2 and 3 below.

Example 7: a Thermosetting Coating Composition (X-7)

58.3 parts (solids content: 35 parts) of the acrylic resin (A-1) solution obtained in Production Example 1, 58.3 parts (solids content: 35 parts) of the epoxy resin (A-2) solution obtained in Production Example 2, 42.9 parts (solids content: 30 parts) of the blocked polyisocyanate curing agent (B-2) obtained in Production Example 4, 30 parts of the phosphazene compound (C-2) obtained in Production Example 6, and 2.4 parts of acetic acid were blended and uniformly stirred. Further, deionized water was added to produce a thermosetting coating composition (X-7) having a solids content of 30%.

TABLE 2

| | | Example | | | | | | | | |
|---|---|---|---|---|---|---|---|---|---|---|
| | | Example 1 | Example 2 | Example 3 | Example 4 | Example 5 | Example 6 | Example 7 | Example 8 | Example 9 |
| Thermosetting coating composition | | X-1 | X-2 | X-3 | X-4 | X-5 | X-6 | X-7 | X-8 | X-9 |
| Hydroxyl group-containing resin(A) | Acrylic resin(A-1) | 58.3 | 58.3 | 58.3 | 58.3 | 58.3 | 58.3 | 58.3 | | |
| | Epoxy resin(A-2) | 58.3 | 42.5 | 42.5 | 42.5 | 58.3 | 58.3 | 58.3 | 42.5 | 42.5 |
| | Polyester resin (A-3) | | | | | | | | 58.3 | |
| | GP600 (Note 1) | | | | | | | | | 35 |

TABLE 2-continued

| | | Example 1 | Example 2 | Example 3 | Example 4 | Example 5 | Example 6 | Example 7 | Example 8 | Example 9 |
|---|---|---|---|---|---|---|---|---|---|---|
| Curing agent(B) | Polyisocyanate(B-1) | | | | | | | | | |
| | Blocked polyisocyanate (B-2) | 42.9 | 42.9 | 42.9 | 42.9 | 42.9 | 42.9 | 42.9 | 42.9 | 42.9 |
| Curing catalyst | Phosphazene compound (C-1) | 5.5 | | | | | | | | |
| | Phosphazene compound (C-2) | | 30 | | | | | | 30 | 30 | 30 |
| | Phosphazene compound (C-3) | | | 30 | | | | | | |
| | Phosphazene compound (C-4) | | | | 30 | | | | | |
| | Phosphazene compound (C-5) | | | | | 5.5 | | | | |
| | Phosphazene compound (C-6) | | | | | | 5.5 | | | |
| | Pyrrolidine | | | | | | | | | |
| Solvent(D) | Deionized water | | | | | | | 178.0 | | |
| | Propylene glycol monomethyl ether | 46.0 | 37.3 | 37.3 | 37.3 | 46.0 | 46.0 | | 37.3 | 60.7 |
| Evaluation | Curability | S | S | S | A | A | S | S | S | S |

TABLE 3

| | | Example 10 | Example 11 | Example 12 | Example 13 | Example 14 | Example 15 | Example 16 | Comparative Example 1 | Comparative Example 2 |
|---|---|---|---|---|---|---|---|---|---|---|
| Thermosetting coating composition | | X-10 | X-11 | X-12 | X-13 | X-14 | X-15 | X-16 | X-17 | X-18 |
| Hydroxyl group-containing resin(A) | Acrylic resin(A-1) | 58.3 | 58.3 | 58.3 | 58.3 | 58.3 | 58.3 | 58.3 | 58.3 | 58.3 |
| | Epoxy resin(A-2) | 42.5 | 58.3 | 58.3 | 50 | 32.5 | 17.5 | | 58.3 | 58.3 |
| | Polyester resin (A-3) | | | | | | | | | |
| | GP600 (Note 1) | 30 | | | | | | | | |
| Curing agent(B) | Polyisocyanate(B-1) | | | | | | | | | |
| | Blocked polyisocyanate (B-2) | | 42.9 | 42.9 | 42.9 | 42.9 | 42.9 | 42.9 | 42.9 | 42.9 |
| Curing catalyst | Phosphazene compound (C-1) | | | | | | | | | |
| | Phosphazene compound (C-2) | 30 | 0.1 | 1 | 10 | 40 | 60 | 70 | | |
| | Phosphazene compound (C-3) | | | | | | | | | |
| | Phosphazene compound (C-4) | | | | | | | | | |
| | Phosphazene compound (C-5) | | | | | | | | | |
| | Phosphazene compound (C-6) | | | | | | | | | |
| | Pyrrolidine | | | | | | | | 5.5 | |
| Solvent(D) | Deionized water | | | | | | | | | |
| | Propylene glycol monomethyl ether | 50.2 | 40.5 | 40.5 | 38.8 | 35.3 | 32.3 | 28.8 | 40.5 | 46.0 |
| Evaluation | Curability | S | C | B | A | S | S | S | D | D |

Note 1 in Tables 2 and 3 denotes as follows.
(Note 1) GP600: trade name, available from Sanyo Chemical Industries, Ltd., polyoxypropylene glycerine ether, molecular weight: 600

2. Thermosetting Coating Compositions Excluding Pigments

Example 17: a Thermosetting Coating Composition (Y-1)

50 parts (solids content: 30 parts) of the acrylic resin (A-1) solution obtained in Production Example 1, 58.3 parts (solids content: 35 parts) of the epoxy resin (A-2) solution obtained in Production Example 2, 42.9 parts (solids content: 30 parts) of the blocked polyisocyanate curing agent (B-2) obtained in Production Example 4, 55.6 parts (27.8 parts of solids content, resin solids content: 5 parts) of the pigment dispersion paste (E-1) obtained in Production Example 9, 5.5 parts of the phosphazene compound (C-1) obtained in Production Example 5 were blended and uniformly stirred. Further, 49.8 parts of propylene glycol monomethyl ether was added to produce a thermosetting coating composition (Y-1) having a solids content of 50%.

Examples 18-22, 24-32, Comparative Examples 3-4

Thermosetting coating compositions (Y-2) to (Y-6), (Y-8) to (Y-18) having a solids content of 50% were produced in the same manner as in Example 17, except for the conditions shown in Tables 4 and 5 below.

Example 23: a Thermosetting Coating Composition (Y-7)

50 parts (solids content: 30 parts) of the acrylic resin (A-1) solution obtained in Production Example 1, 58.3 parts (solids content: 35 parts) of the epoxy resin (A-2) solution obtained in Production Example 2, 42.9 parts (solids content: 30 parts) of the blocked polyisocyanate curing agent (B-2) obtained in Production Example 4, 55.6 parts (solids content: 27.8 parts, resin solids content: 5 parts) of the pigment dispersion paste (E-2) obtained in Production Example 10, 30 parts of the phosphazene compound (C-2) obtained in Production Example 6, and 2.4 parts of acetic acid were blended and uniformly stirred. Further, 206.8 parts of deionized water was added to produce a thermosetting coating composition (Y-7) having a solids content of 30%.

TABLE 4

| | | Example 17 | Example 18 | Example 19 | Example 20 | Example 21 | Example 22 | Example 23 | Example 24 | Example 25 |
|---|---|---|---|---|---|---|---|---|---|---|
| Thermosetting coating composition | | Y-1 | Y-2 | Y-3 | Y-4 | Y-5 | Y-6 | Y-7 | Y-8 | Y-9 |
| Hydroxyl group-containing resin(A) | Acrylic resin(A-1) | 50 | 50 | 50 | 50 | 50 | 50 | 50 | | |
| | Epoxy resin(A-2) | 58.3 | 42.5 | 42.5 | 42.5 | 58.3 | 58.3 | 42.5 | 42.5 | 42.5 |
| | Polyester resin (A-3) | | | | | | | | 50 | |
| | GP600 (Note 1) | | | | | | | | | 30 |
| Curing agent(B) | Polyisocyanate(B-1) | | | | | | | | | |
| | Blocked polyisocyanate (B-2) | 42.9 | 42.9 | 42.9 | 42.9 | 42.9 | 42.9 | 42.9 | 42.9 | 42.9 |
| Curing catalyst | Phosphazene compound (C-1) | 5.5 | | | | | | | | |
| | Phosphazene compound (C-2) | | 30 | | | | | 30 | 30 | 30 |
| | Phosphazene compound (C-3) | | | 30 | | | | | | |
| | Phosphazene compound (C-4) | | | | 30 | | | | | |
| | Phosphazene compound (C-5) | | | | | 5.5 | | | | |
| | Phosphazene compound (C-6) | | | | | | 5.5 | | | |
| | Pyrrolidine | | | | | | | | | |
| Solvent(D) | Deionized water | | | | | | | 206.8 | | |
| | Propylene glycol monomethyl ether | 44.3 | 35.7 | 35.7 | 35.7 | 44.3 | 44.3 | | 35.7 | 55.7 |
| Pigment dispersion paste | (E-1) | 55.6 | 55.6 | 55.6 | 55.6 | 55.6 | 55.6 | | 55.6 | 55.6 |
| | (E-2) | | | | | | | 55.6 | | |
| Evaluation | Water resistance | B | A | S | S | B | C | S | S | B |

TABLE 5

| | | Example 26 | Example 27 | Example 28 | Example 29 | Example 30 | Example 31 | Example 32 | Comparative Example 3 | Comparative Example 4 |
|---|---|---|---|---|---|---|---|---|---|---|
| Thermosetting coating composition | | Y-10 | Y-11 | Y-12 | Y-13 | Y-14 | Y-15 | Y-16 | Y-17 | Y-18 |
| Hydroxyl group-containing resin(A) | Acrylic resin(A-1) | 50 | 50 | 50 | 50 | 50 | 50 | 50 | 50 | 50 |
| | Epoxy resin(A-2) | 42.5 | 58.3 | 58.3 | 50 | 32.5 | 17.5 | | 58.3 | 58.3 |
| | Polyester resin (A-3) | | | | | | | | | |
| | GP600 (Note 1) | | | | | | | | | |
| Curing agent(B) | Polyisocyanate(B-1) | 30 | | | | | | | | |
| | Blocked polyisocyanate (B-2) | | 42.9 | 42.9 | 42.9 | 42.9 | 42.9 | 42.9 | 42.9 | 42.9 |
| Curing catalyst | Phosphazene compound (C-1) | | | | | | | | | |
| | Phosphazene compound (C-2) | 30 | 0.1 | 1 | 10 | 40 | 60 | 70 | | |
| | Phosphazene compound (C-3) | | | | | | | | | |
| | Phosphazene compound (C-4) | | | | | | | | | |
| | Phosphazene compound (C-5) | | | | | | | | | |
| | Phosphazene compound (C-6) | | | | | | | | | |
| | Pyrrolidine | | | | | | | | | 5.5 |

TABLE 5-continued

| | | Example 26 | Example 27 | Example 28 | Example 29 | Example 30 | Example 31 | Example 32 | Comparative Example 3 | Comparative Example 4 |
|---|---|---|---|---|---|---|---|---|---|---|
| Solvent(D) | Deionized water | | | | | | | | | |
| | Propylene glycol monomethyl ether | 48.5 | 38.8 | 38.8 | 37.2 | 33.7 | 30.7 | 27.2 | 38.8 | 44.3 |
| Pigment dispersion paste | (E-1) | 55.6 | 55.6 | 55.6 | 55.6 | 55.6 | 55.6 | 55.6 | 55.6 | 55.6 |
| | (E-2) | | | | | | | | | |
| Evaluation | Water resistance | S | A | S | S | A | B | C | A | B |

Evaluation Method

The thermosetting coating compositions containing pigments (Y-1) to (Y-18) and the thermosetting coating compositions excluding pigments (X-1) to (X-18) for the purpose of evaluating curability were evaluated for water resistance and curability. In the present invention, it is preferable that both the curability and the water resistance are good.

Evaluation Tests

The curability and water resistance were evaluated by the following method. The evaluation results of the thermosetting coating compositions excluding pigments (X-1) to (X-18) are shown in Tables 2 and 3 above.

The evaluation results of the thermosetting coating compositions containing pigments (Y-1) to (Y-18) are shown in Tables 4 and 5 above.

Curability (Gel Fraction)

The thermosetting coating compositions (X-1) to (X-18) obtained in Examples and Comparative Examples were each applied on a glass plate using an applicator so as to form a cured film having a thickness of about 30 μm, and heated at a temperature of 140.degree. C. for 30 minutes. Each cured coating film was peeled off from the glass plate. Then, the coating film was put in a wire net and placed in a separate round bottom flask. 100 g of acetone was added relative to 1 g of the coating film, and it was refluxed for 5 hours. The coating film was then taken out and dried at 105.degree. C. for 30 minutes. The weight of the coating film was measured, and the gel fraction was calculated by the following equation.

Gel fraction(%)=Weight of coating film after reflux/ weight of coating film before reflux×100

The curability was evaluated in accordance with the following criteria. S to C denote pass, and D denotes fail.
S: The gel fraction is 70% or more.
A: The gel fraction is 60% or more and less than 70%.
B: The gel fraction is 50% or more and less than 60%.
C: The gel fraction is 40% or more and less than 50%.
D: The gel fraction is less than 40%.

Water Resistance (Gloss Retention)

A cold rolled steel sheet (400 times 300 times 0.8 mm in size) having been treated with "Palbond #3020" (Nihon Parkerizing Co., Ltd., zinc phosphate treatment) was electrodeposition-coated with "Elecron GT-10" (available from Kansai Paint Co., Ltd., a thermosetting epoxy resin-based cationic electrodeposition paint) so as to form a coating film having a thickness of 20 μm, and heated for 30 minutes at 170° C. to cure. The cured film was then air spray coated with "TP-65" (available from Kansai Paint Co., Ltd., trade name, a polyester/melamine resin-based automotive intermediate paint) so as to have a dry film thickness of 35 μm, and heated for 30 minutes at 140° C. to cure.

Subsequently, the thermosetting coating compositions (Y-1) to (y-18) obtained in Examples and Comparative Examples were each applied thereon using an applicator so as to form a cured coating film having a thickness of about 20 μm, and heated for 30 minutes at 140° C. to cure.

The obtained test plates were immersed in pure water and held at 40.degree. C. for 240 hours. The glossiness thereof after the immersion was measured to calculate the gloss retention.

The gloss retention was calculated by the following equation based on the value obtained by measuring the specular gloss of a surface (test surface) of the test plate at an incident angle of 60 degrees according to JIS Z 8741-1997.

Gloss retention(%)=(Glossiness after water resistance test/initial glossiness)×100

The water resistance was evaluated in accordance with the following criteria.
S: The gloss retention is 95% or more, so that the water resistance is excellent.
A: The gloss retention is 90% or more and less than 95%, so that the water resistance is quite good.
B: The gloss retention is 80% or more and less than 90%, so that the water resistance is good.
C: The gloss retention is 70% or more and less than 80%, so that the water resistance is indifferent.
D: The gloss retention is less than 70%, so that the water resistance is inferior.

The invention claimed is:

1. A thermosetting coating composition, comprising:
a hydroxyl group-containing resin;
a curing agent;
a phosphazene compound; and
a solvent, the hydroxyl group-containing resin is a resin that can be crosslinked with the curing agent,
wherein the curing agent is a polyisocyanate curing agent and/or a blocked polyisocyanate curing agent,
the phosphazene compound acts as a strong base catalyst for the crosslinking reaction, and
the phosphazene compound contains a hydroxyl group,
the phosphazene compound having one or more organic groups in one molecule represented by the following general formula (1)

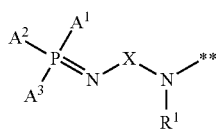 (1)

wherein, in the general formula (1), ** represents a bond,
X represents a divalent organic group having 1 to 18 carbon atoms,
$R^1$ represents a hydrogen atom or an organic group having 1 to 18 carbon atoms,
$A^1$, $A^2$, and $A^3$ each represent a monovalent organic group,
$A^1$, $A^2$, and $A^3$ each contain at least one nitrogen atom,
a phosphorus atom adjacent to $A^1$, $A^2$, and $A^3$ and a nitrogen atom in the organic group represented by $A^1$ are singly bonded,
the phosphorus atom adjacent to $A^1$, $A^2$, and $A^3$ and a nitrogen atom in the organic group represented by $A^2$ are singly bonded, and
the phosphorus atom adjacent to $A^1$, $A^2$, and $A^3$ and a nitrogen atom in the organic group represented by $A^3$ are singly bonded.

2. The thermosetting coating composition according to claim 1, wherein the phosphazene compound has a number average molecular weight of 400 or more.

3. The thermosetting coating composition according to claim 1, wherein the content of the phosphazene compound is 0.1 parts by mass or more and 30 parts by mass or less based on 100 parts by mass of resin solids of the thermosetting coating composition.

4. The thermosetting coating composition according to claim 1, wherein the hydroxyl group-containing resin is at least one selected from the group consisting of an acrylic resin, a polyester resin, and an epoxy resin.

5. The thermosetting coating composition according to claim 1, wherein the solvent is water, and the solvent is contained in the thermosetting coating composition in an amount of 70% by mass or more based on the total mass of the thermosetting coating composition.

6. The thermosetting coating composition according to claim 5, wherein the hydroxyl group-containing resin is water dispersible or water dissoluble.

7. A coated article obtained by applying the thermosetting coating composition according to claim 1 to an article to be coated.

8. A coated article, comprising a multilayer coating film obtained by applying the thermosetting coating composition according to claim 1 to an article to be coated; and applying a top coat composition to the article to be coated.

* * * * *